United States Patent
Noh et al.

(10) Patent No.: US 10,607,770 B2
(45) Date of Patent: Mar. 31, 2020

(54) SHIELD UNIT FOR WIRELESS CHARGING AND WIRELESS POWER TRANSMISSION MODULE COMPRISING SAME

(71) Applicant: Amosense Co., Ltd., Cheonan-si (KR)

(72) Inventors: Jin Won Noh, Gwangju (KR); Kil Jae Jang, Seongnam-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 79 days.

(21) Appl. No.: 15/571,937

(22) PCT Filed: May 18, 2016

(86) PCT No.: PCT/KR2016/005253
§ 371 (c)(1),
(2) Date: Nov. 6, 2017

(87) PCT Pub. No.: WO2016/186444
PCT Pub. Date: Nov. 24, 2016

(65) Prior Publication Data
US 2019/0027302 A1 Jan. 24, 2019

(30) Foreign Application Priority Data
May 18, 2015 (KR) ........................ 10-2015-0068904

(51) Int. Cl.
*H01F 27/36* (2006.01)
*H01F 38/14* (2006.01)
(Continued)

(52) U.S. Cl.
CPC ........... *H01F 27/365* (2013.01); *H01F 27/25* (2013.01); *H01F 27/255* (2013.01); *H01F 38/14* (2013.01);
(Continued)

(58) Field of Classification Search
CPC ............ H02J 50/10; H02J 50/23; H02J 50/70; H01Q 1/526
(Continued)

(56) References Cited

U.S. PATENT DOCUMENTS 9,397,505 B2  7/2016  Lee et al.
9,413,175 B2  8/2016  Park et al.
(Continued)

FOREIGN PATENT DOCUMENTS

CN    104011814 A    8/2014
CN    104321928 A    1/2015
(Continued)

*Primary Examiner* — Michael R. Fin
(74) *Attorney, Agent, or Firm* — Daly Crowley Mofford & Durkee, LLP

(57) ABSTRACT

Provided are a shielding unit for wireless charging and a wireless power transfer module including the same. The shielding unit for wireless charging includes a first sheet for a wireless power transfer antenna, and a second sheet for another antenna operating in a different frequency band from that of the wireless power transfer antenna. The first sheet is provided in a first region which is disposed on a side of a virtual boundary line, and the second sheet is provided in a second region which is disposed on the opposite side of the first region.

12 Claims, 6 Drawing Sheets

(51) Int. Cl.
    *H01Q 1/52*         (2006.01)
    *H01Q 21/30*      (2006.01)
    *H01F 27/255*     (2006.01)
    *H01F 27/25*      (2006.01)
    *H02J 50/10*      (2016.01)
    *H02J 50/23*      (2016.01)
    *H02J 50/70*      (2016.01)
    *H02J 7/02*       (2016.01)
    *H04B 5/00*      (2006.01)
    *H01Q 7/00*      (2006.01)

(52) U.S. Cl.
    CPC ............ *H01Q 1/526* (2013.01); *H01Q 21/30* (2013.01); *H02J 7/025* (2013.01); *H02J 50/10* (2016.02); *H02J 50/23* (2016.02); *H02J 50/70* (2016.02); *H04B 5/0037* (2013.01); *H01Q 7/00* (2013.01)

(58) Field of Classification Search
    USPC .......................................................... 307/104
    See application file for complete search history.

(56) References Cited

U.S. PATENT DOCUMENTS

| | | | |
|---|---|---|---|
| 2014/0320369 A1* | 10/2014 | Azenui | H01Q 1/526 343/841 |
| 2014/0354222 A1 | 12/2014 | Park et al. | |
| 2014/0354223 A1 | 12/2014 | Lee et al. | |
| 2015/0077296 A1* | 3/2015 | An | H01P 11/00 343/720 |
| 2015/0256023 A1* | 9/2015 | Yeom | H02J 5/005 320/108 |
| 2016/0104937 A1* | 4/2016 | Kumura | H01Q 1/2208 343/788 |
| 2016/0180120 A1* | 6/2016 | Wallner | G06Q 20/322 235/449 |
| 2017/0179753 A1* | 6/2017 | Choi | H01F 38/14 |

FOREIGN PATENT DOCUMENTS

| | | |
|---|---|---|
| KR | 10-2014-0019955 A | 2/2014 |
| KR | 10-2014-0142139 A | 12/2014 |
| KR | 10-2014-0143009 A | 12/2014 |
| KR | 10-2015-0051922 A | 5/2015 |

\* cited by examiner

SHIELD UNIT FOR WIRELESS CHARGING AND WIRELESS POWER TRANSMISSION MODULE COMPRISING SAME

CROSS-REFERENCE TO RELATED APPLICATION

This application is a U.S. National Stage of PCT/US2016/005253 filed in the Korean language on May 18, 2016, entitled: "Shielding Unit For Wireless Charging And Wireless Power Transmission Module Comprising Same" which application claims priority to Korean Application No. 10-2015-0068904 filed on May 18, 2015, which applications are each hereby incorporated herein by reference in their entireties.

BACKGROUND OF THE DISCLOSURE

Field of the Disclosure

The present invention relates to a shielding unit for wireless charging and a wireless power transfer module including the same.

Description of the Related Art

Recently, various functions including Radio Frequency Identification (RFID), Near Field Communication (NFC), a wireless charger, an interactive pen tablet and the like are added to portable terminals including mobile phone and tablet Personal Computers (PCs).

NFC is a of RFID, which is an electronic tag, and refers to a technology for transferring data between terminal devices within a short range of 10 cm by using a non-contact short-range wireless communication module using a frequency band of 13.56 MHz. NFC is extensively used for mobile payment as well as a file transfer method for transferring goods information at a supermarket or a general store, or travel information for visitors, traffic information, access control and locking devices, and the like.

In addition, according to the latest Google's announcement, the "Android Beam" equipped with smart phone provides the ability to transfer photos, business cards, files, maps, web sites, etc., as well as mobile payments, as NFC-based local area information transfer and reception functions, from a phone to another phone.

Meanwhile, a portable terminal has a wireless charging function for wirelessly charging a built-in battery. The wireless charging function is performed by a wireless power receiving module built in the portable terminal, and a wireless power transfer module for supplying power to the wireless power receiving module.

In addition, the wireless charging may be classified into a magnetic induction type and a magnetic resonance type, and may be classified into a Power Matters Alliance (PMA) standard and a Qi standard depending on a method of detecting a wireless power receiving module accessing the wireless power transfer module.

In recent years, the thickness of the wireless power receiving module built in the portable terminal has been reduced as the size of the wireless terminal has been reduced, and the total thickness of the wireless power receiving module has been designed to be equal to or less 0.6 mm, or even equal to or less 0.3 mm.

When the thickness of the wireless power receiving module is designed to be equal to or less 0.6 mm, or even equal to or less 0.3 mm, it is difficult to realize the characteristics required for the wireless charging function.

When the antenna unit is provided with a plurality of antennas serving different roles, in order to improve the performance of the antenna, different kinds of sheets suitable for the respective antennas are stacked to constitute a shielding unit. Accordingly, the shielding unit must be composed of a plurality of sheet layers, which has a limitation in reducing the overall thickness of the shielding unit.

Accordingly, there is a need to develop a shielding unit capable of satisfying the requirements required for wireless charging while meeting the demand for compact size of a portable terminal.

SUMMARY OF THE DISCLOSURE

To solve the above problems and defects, it is an object of the present invention to provide a shielding unit for wireless charging to reduce the total thickness by arranging the two sheets in parallel on the same plane, in constructing the shielding unit to be composed of at least two sheets.

It is another object of the present invention to provide a shielding unit for wireless charging to be optimized the shielding performance of a magnetic field according to a frequency band, in that antennas operating in different frequency bands are separately disposed on different region, and a shielding sheet having different characteristics is disposed on a region corresponding to each antenna.

It is another object of the present invention to provide a wireless power transfer module to reduce the total thickness while satisfying the charging characteristics required in the wireless charging system.

To accomplish the above and other objects of the present invention, according to aspect of the present invention, there is provided an shielding unit for wireless power charging, comprising: a first sheet for a wireless power transfer antenna, and a second sheet for another antenna operating in a different frequency band from that of the wireless power transfer antenna, wherein the first sheet is provided in a first region which is disposed on a side of a virtual boundary line, and the second sheet is provided in a second region which is disposed on the opposite side of the first region.

The first sheet and the second sheet may be provided adjacent to each other such that at least one side the first sheet and the second sheet are in parallel on the same plane.

In addition, the first sheet and the second sheet may be arranged such that ends of the first sheet and the second sheet are overlapped each other.

In addition, the first sheet and the second sheet may be covered by a protective film on the same plane.

In addition, the first sheet and the second sheet may have different characteristics in a predetermined frequency band.

The first sheet may satisfy at least one of the following conditions of (1) to (3) in a frequency band of 100 to 300 kHz, compared to the second sheet, (1) permeability: the first sheet> the second sheet, (2) saturating permeability: the first sheet> the second sheet, (3) permeability: the first sheet=the second sheet, permeability loss rate: the first sheet< the second sheet.

The second sheet may satisfy at least one of the following conditions of (1) to (2) in a frequency of 13.56 MHz, compared to the first sheet, (1) permeability: the first sheet< the second sheet, (2) permeability: the first sheet=the second sheet, permeability loss rate: the first sheet> the second sheet.

The first sheet may be a ribbon sheet including at least one of an amorphous alloy and nanocrystalline alloy, and the second sheet may be a ferrite sheet.

In addition, the first sheet may be formed by stacking a plurality of the ribbon sheets. The wireless power transfer antenna may be disposed on a surface of the first sheet, and another antenna may be an NFC antenna, which is disposed on a surface of the second sheet.

The second sheet may include an extended sheet disposed on the first region, and the first sheet may be stacked on the extended sheet.

According to another aspect of the present invention, a wireless power transfer module comprising: an antenna unit including a wireless power transfer antenna and at least one other antenna operating in a different frequency band from that of the wireless power transfer antenna; and a shielding unit disposed on a surface of the antenna unit to shield the magnetic field and to condense the magnetic field in a desired direction.

At least one of the first sheet and the second sheet can be divided into a plurality of fine pieces, the plurality of fine pieces can be entirely or partially insulated from each other, and the plurality of fine pieces may be irregular shape.

Also, the antenna unit may include a Magnetic Secure Transfer (MST) antenna, and the MST antenna may be disposed on the first region or on the second region. According to the present invention, in constructing antennas operating in different frequency bands to dispose on different regions, the shielding unit may be formed of a plurality of sheets having different characteristics, and the two sheets may be arranged in parallel on the same plane. Thus, entire thickness can be reduced, while satisfying the charging characteristics required by the wireless charging method. In addition, shielding sheets having different characteristics are disposed on the regions corresponding to the respective antennas to optimize the shielding performance of the magnetic field according to the frequency band of the antenna.

BRIEF DESCRIPTION OF THE DRAWINGS

FIGS. 2A and 2B are cross-sectional views illustrating a shielding unit for wireless charging according to another embodiment of the present invention, wherein FIG. 2B is a view showing a case where a first sheet and a second sheet are partially overlapped with each other, FIG. 2A is a view showing a case where the first sheet is disposed on the first region and the second region.

FIGS. 6A and 6B illustrate a modification of the wireless power transfer module according to an embodiment of the present invention, wherein, FIG. 6A shows a case where a through-hole is formed on a circuit board, FIG. 6B is a view showing a case where the second portion is disposed on the width direction of the first portion.

DETAILED DESCRIPTION OF THE DISCLOSURE

The above and other objects, features, and advantages of the present invention can be appreciated by the following description and will be understood more clearly by embodiment of the present invention. In addition, it will be appreciated that the objects and advantages of the present invention will be easily realized by means shown in the appended patent claims, and combinations thereof. Accordingly, the technical spirit of the present invention can be easily implemented by an ordinary skill in the art.

Further, if it is determined that the detailed description of the known art related to the present invention makes the gist of the present invention unnecessarily obscure, a detailed description thereof will be omitted.

Figure 4:
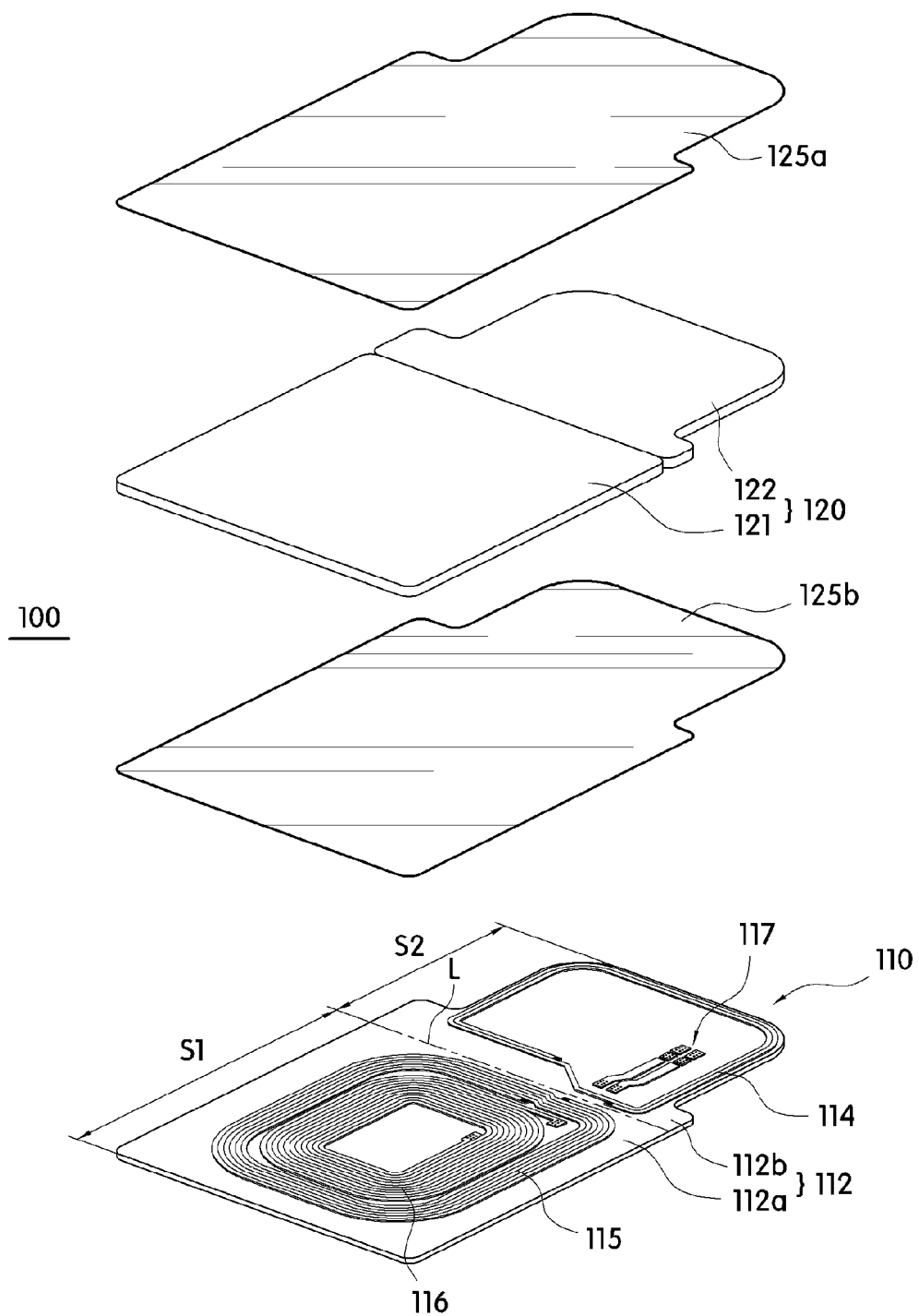
FIG. 4 is a perspective view schematically illustrating a wireless power transfer module according to an embodiment of the present invention.
Figure 5:
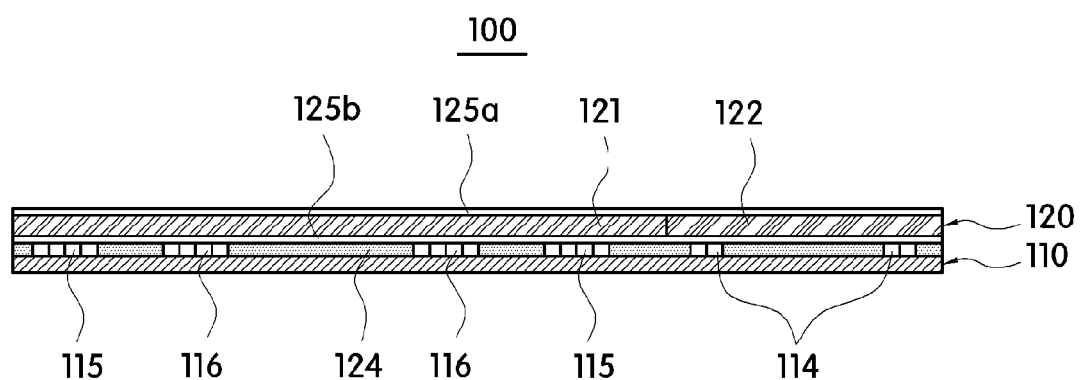
FIG. 5 is a cross-sectional view of FIG. 2.

At first, referring to FIGS. 4 and 5, a wireless power transfer module 100 according to an embodiment of the present invention includes an antenna unit 110 and a shielding unit 120.

The antenna unit 110 may receive a wireless signal transmitted from a portable electronic device such as a cellular phone, a PDA, a PMP, a tablet, a multimedia device, or the like, and may transmit a wireless signal to the portable electronic device.

The antenna unit 110 may include a plurality of antennas 114, 115, and 116 performing different roles, and may be fixed to a surface of the shielding unit 120 by an adhesive layer 124.

Here, the adhesive layer 124 may be a material having a adhesive properties such as a bond, a PVC, a rubber, a double-sided tape or the like, and may include a conductive material.

A radiator of a plurality of antennas 114, 115, and 116 may be formed of a flat coil wound in a clockwise direction or counterclockwise direction. The flat coil may have a circular shape, an elliptical shape, a spiral shape, or a polygonal shape such as a quadrangular shape. A surface of the radiator may be formed by etching a metal foil such as a copper foil.

In addition, the plurality of antenna may be formed of a printed pattern on a surface of a circuit board 112 and attached to a surface of the shielding unit 120 via the circuit board 112.

Here, the circuit board 112 is a base component having at least one antennas pattern and circuit parts formed on its upper portion, and is a material having heat resistance and pressure resistance and flexibility. Considering the physical properties of such a material, a film such as PI or PET, which is a thermosetting polymer film, may be used as the circuit board 112.

The antenna unit 110 may include at least one antenna 116 for transmitting power through a wireless power signal. At least one other antenna using a different frequency band than the wireless power transfer antenna may be configured together.

Here, the wireless power transfer antenna 116 may be a reception antenna functioning as a reception coil (Rx coil), or a transmission antenna functioning as a transmission coil (Tx coil).

In an exemplary example, the antenna unit 110 includes a wireless power transfer antenna 116, the NFC antenna 114 using different frequency bands to perform different roles such as wireless power charging, near field communication, and the antenna unit 110 may further include a MST antenna 115.

Here, since the NFC antenna 114 use higher frequency band than that of the wireless power transfer antenna 116, the NFC antenna 114 may be formed of a rectangular conductive pattern having a fine line width. Since the wireless power transfer antenna 116 is required to power transmission and use a lower frequency band than that the NFC antenna 114, the wireless power transfer antenna 116 may have wider line width than that of the NFC antenna 114. Hereinafter, for convenience of description, it is assumed that a plurality of antennas 114, 115, and 116 constituting an antenna unit 110 are formed of a printed pattern on a surface of a circuit board 112. As shown FIG. 4, the antenna unit 110 includes a NFC antenna 114, a MST antenna 115, and a wireless power transfer antenna 116 and formed on the surface of the circuit board 112. The NFC antenna 114, the MST antenna 115, and the wireless power transfer antenna 116 are electrically connected to a terminal 117 provided on the circuit board 112, or may be electrically connected to each other via a via-hole.

However, the present invention is not limited to the plurality of antennas 114, 115, and 116. A radiator of a plurality of antennas 114, 115, and 116 may be formed of a flat coil wound in a clockwise direction or counterclockwise direction. The flat coil may have a circular shape, an elliptical shape, a spiral shape, or a polygonal shape such as a quadrangular shape. The radiator may be attached to a surface of the shielding unit 120. The radiator may be provided in the form of a combination of the flat coil and the pattern-formed antenna on a surface of the circuit board.

As shown in FIG. 4, the plurality of antennas 114, 115, and 116 applied to the present invention is disposed on different regions of the same plane such that a first region S1 is disposed on a side of a virtual boundary line L, and a second region S2 is disposed on the opposite side of the first region S1.

The first region S1 may be a region of a left side of the virtual boundary line L, or a first portion 112a which is a left side of the circuit board 112, and the second region S2 may be an region of a right side of the virtual boundary line L, or a second portion 112b which is the right side of the circuit board 112.

As shown in FIG. 4, the wireless power transfer antenna 116 and the MST antenna 115 of the plurality of antennas 114, 115, and 116 may be formed on the first portion 112a of the circuit board 112 corresponding to the first region S1, and the NFC antenna 114 may be formed on the second portion 112b of the circuit board 112 corresponding to the second region S2. The wireless power transfer antenna 116 and MST antenna 115 among the plurality of antennas 114, 115 and 116 may be formed of the second portion 112b of the circuit board 112 which is the second region S2. The NFC antenna 114 may be formed of the first portion 112a of the circuit board 112 which is the first region S1.

In an exemplary example, the wireless power transfer antenna 116 operating in frequency bands of 100 to 300 kHz and the NFC antenna 114 operating in frequency of 13.56 MHz may be formed on different portions on a circuit board 112.

Accordingly, the antenna unit 110, according to an exemplary embodiment, is formed such that the antennas operating in different frequency bands are disposed on different regions. Thus, the shielding unit 120 may be appropriately configured to shield the magnetic field according to the frequency band while reducing the overall thickness of the shielding unit 120. A detailed description thereof will be described later.

Figure 6A:
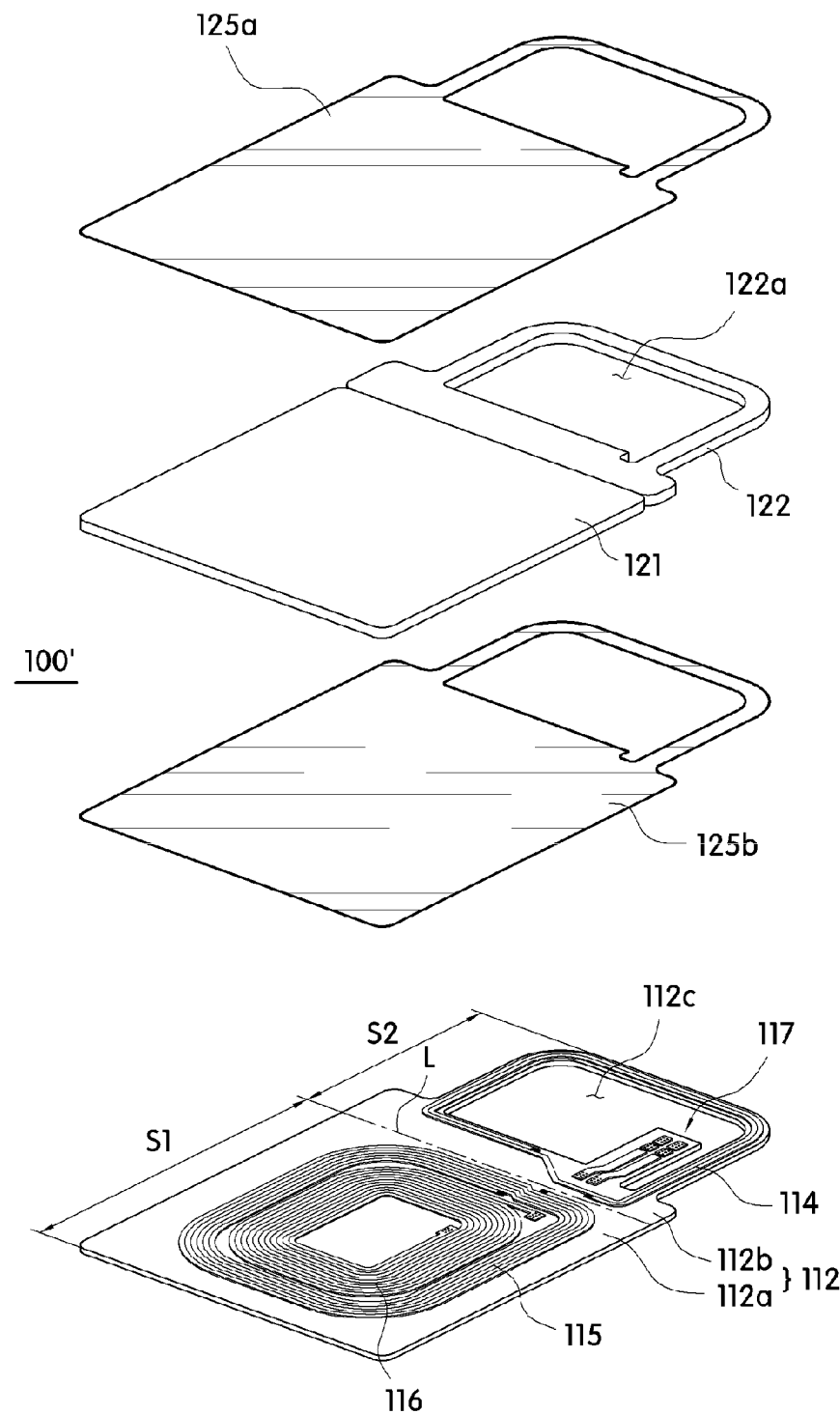
Figure 6B:
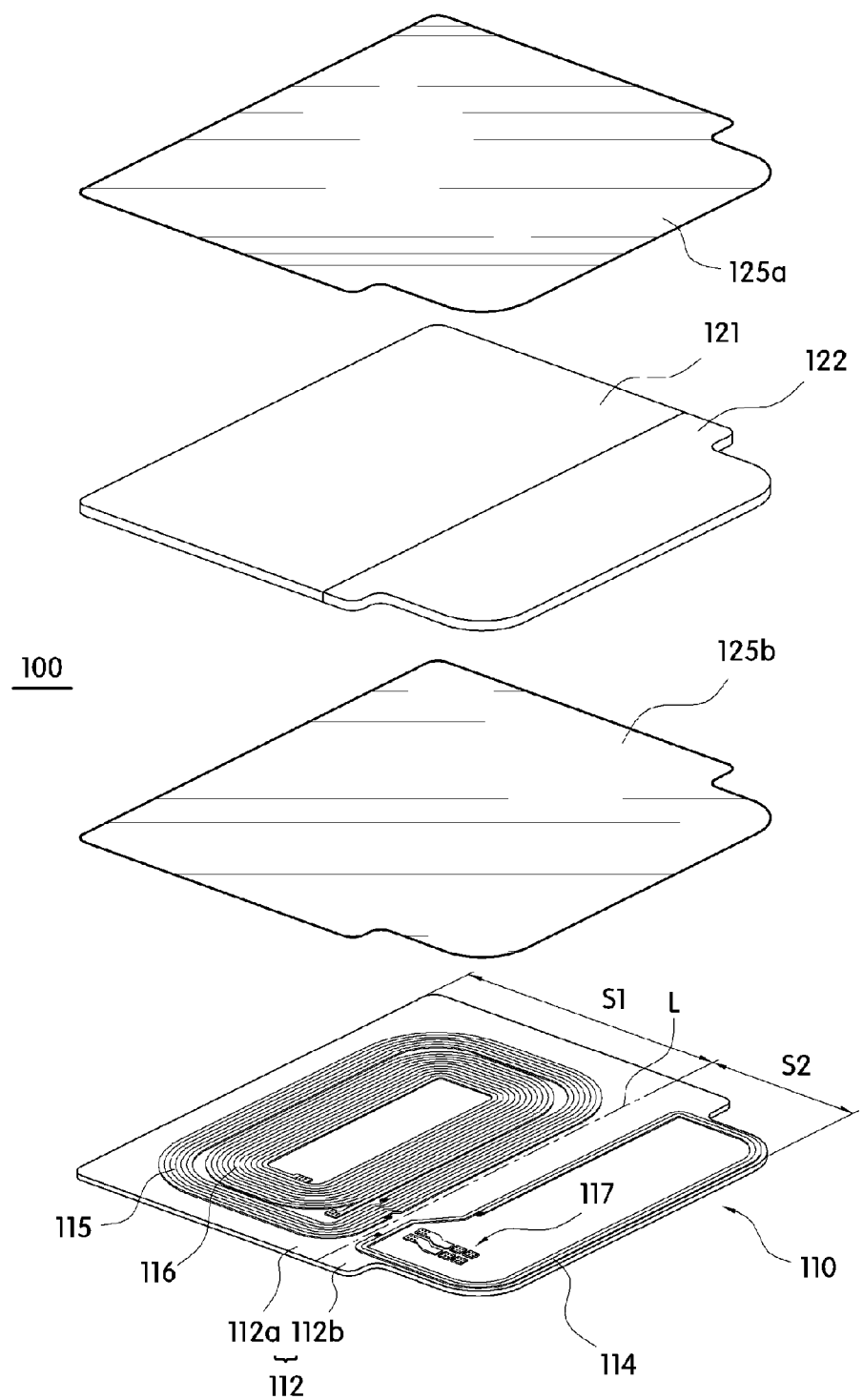

In an exemplary example, the NFC antenna 114 is formed on the second portion 112b of the circuit board 112. A radiator of the NFC antenna 114 may be formed by winding a plurality of times along a rim of the second portion 112b. At this time, an opening portion 112c may be formed on a central portion excluding the rim of the second portion 112b formed the NFC antenna 114, as shown in FIG. 6A. in case that the antenna unit 110 is applied to an electronic device such as a cellular phone, the opening portion 112c includes various components, for example a camera module. Thus, the opening portion 112c may be efficiently utilized.

The shielding unit 120 formed of a plate-shaped member having a predetermined region shields a magnetic field generated by the antenna unit 110 and condense the magnetic field in a desired direction.

For this purpose, the shielding unit 120 may be provided to cover a surface of the antenna unit 110, and may include a first sheet 121 and a second sheet 122 to increase the performance of antenna operating in different frequency bands, respectively.

In an exemplary embodiment, the first sheet 121 is disposed on the first portion 112a of the circuit board 112 corresponding to the first region S1 to improve the performance of the wireless power transfer antenna 116 which is operating at a low frequency band of 100 to 300 kHz. The second sheet 122 may be disposed on the second portion 112b of the circuit board 112 correspond to the second region S2 to increase the performance of the NFC antenna 114 which is operating at a high frequency band of 13.56 MHz.

The first sheet 121 may include a region, which can cover the wireless power transfer antenna 116, and the second sheet 122 may include a region, which can cover the NFC antenna 114 respectively. In addition, the first sheet 121 may include, or not include an upper portion of the MST antenna 115, in case that the MST antenna 115 is disposed outside the wireless power transfer antenna 116.

Since the first sheet 121 is disposed on a region of the wireless power transfer antenna 116 and the second sheet 122 is disposed on the region of the NFC antenna 114, the shielding unit 120 can improve the performance of the wireless power transfer antenna 116 and the NFC antenna 114, respectively.

Figure 1:
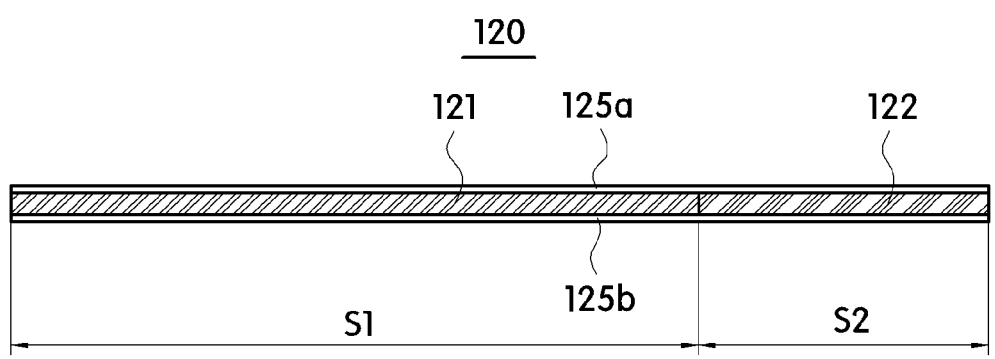
FIG. 1 is a cross-sectional view of a shielding unit for wireless charging according to an embodiment of the present invention.

As shown in FIGS. 1 and 4, the first sheet 121 and the second sheet 122 are arranged such that their ends abut against each other on the same plane, and the first sheet 121 and the second sheet 122 are disposed in parallel with each other. Thus, the overall thickness of the shielding unit 120 may be reduced while enhancing the performance of the antennas 114 and 116, respectively.

Accordingly, since the first sheet 121 and the second sheet 122 are arranged on the same plane in parallel, the overall thickness of the shielding unit 120 may be set to be the same thickness as the sheet having a relatively thick thickness among the thickness of the first sheet 121 or the second sheet 122. Therefore, even if the total thickness of the wireless power transfer module 100 is reduced to equal to or less 0.6 mm, or even equal to or less 0.3 mm, the performance required by the wireless charging method may be satisfied. However, it should be understood that the thickness of the wireless power transfer module 100 is not limited to described above, but should be understood to be a very thin.

In an exemplary embodiment, the shielding unit 120 is provided with separate protective films 125a and 125b to cover at least one of the upper surface and the lower surface of the first sheet 121 and the second sheet 122. Preferably, the protective films 125a and 125b may be provided on the upper and lower surfaces of the shielding unit 120, respectively. The protective films 125a and 125b are attached to the same surface of the first sheet 121 and the second sheet 122 via the adhesive layer, so that the first sheet and the second sheet can be integrated. The adhesive layer may be made of a nonconductive material. In case that at least one of the first sheet 121 and the second sheet 122 is divided into a plurality of fine pieces, the adhesive layer is absorbed between adjacent fine pieces to isolate pieces. In addition, the adhesive layer may be provided as an adhesive agent, a film-type substrate or a protective film coated with an adhesive agent on one or both sides of the substrate.

Meanwhile, as shown in FIG. 6A, the opening portion 112c is formed at the center of the NFC antenna 114. The second sheet 122 disposed on the upper side of the NFC antenna 114 also has a through hole 122a on a region corresponding to the opening portion 112c.

Figure 2A:
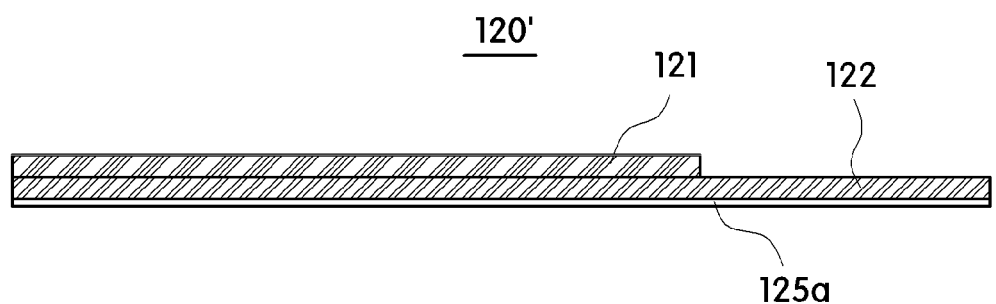
Figure 2B:
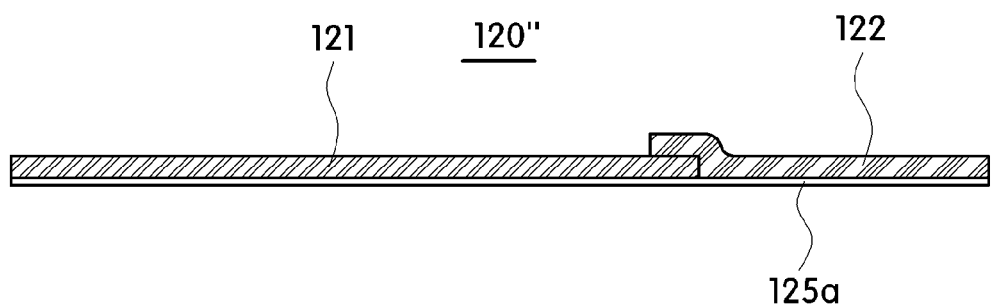

In addition, as shown in FIG. 2B, the shielding unit 120" may be disposed such that the ends of the first sheet 121 and the second sheet 122 are overlapped each other. As shown in FIG. 2A, the shielding unit 120' may be provided such that the second sheet 122 may fully cover the first portion 112a and the second portion of circuit board 112 to improve the performance of the NFC antenna 114. The first sheet 121 may be stacked on the upper side of the second sheet 122. Here, the first sheet 121 may be disposed on the upper side of the first portion 112a of the circuit board 112 corresponding to the wireless power transfer antenna 116.

Meanwhile, the shielding unit 120, according to an exemplary embodiment, may be provided that the first sheet 121 and the second sheet 122 may have different characteristics in the predetermined frequency band to improve the performance of each antenna operating a different role. That is, the first sheet 121 and the second sheet 122 may have different permeabilities in a predetermined frequency band, or different saturation magnetic fields. When the first sheet 121 and the second sheet 122 have the same permeability, the permeability loss rate may be set to have a different value.

Here, the first sheet 121 and the second sheet 122 may have a permeability of 100 to 1200.

More specifically, the first sheet 121 may have a relatively higher permeability in a low frequency band of 100 to 300 kHz and higher the saturating magnetic field in a frequency band of 100 to 300 kHz than that of the second sheet. When the first sheet 121 and the second sheet 122 have the same permeability in a frequency band of 100 to 300 kHz, the permeability loss rate of the first sheet 121 may have a relatively lower value than that of the second sheet 122.

For example, a ribbon sheet 123a, 123b, or 123c including at least one of an amorphous alloy and a nanocrystalline alloy may be used for the first sheet 121. A ferrite sheet may be used for the second sheet 122.

Accordingly, since the ribbon sheet 123a, 123b, or 123c including at least one of an amorphous alloy and a nanocrystalline have a relatively higher permeability than that of the ferrite sheet 122 in a low frequency band of 100 to 300 kHz, a time-varying magnetic field generated by the power transfer in the frequency band of 100 to 300 kHz from a power transfer device during wireless charging is induced to the first sheet 121 having a relatively high permeability. Thus, the wireless power transmission antenna 116 disposed on the first sheet 121 can receive the wireless power signal with high efficiency.

Meanwhile, in case that a permanent magnet is provided in a transmission device, the first sheet 121 is required to shield the time-invariant magnetic field by the permanent magnet. However, since the time-invariant magnetic field has more affects on the shielding units 120 than the time-variant magnetic field, the shielding sheet may be magnetic-saturated. Thus, the performance of the shield sheet is reduced, or the power transfer efficiency is drastically lowered.

Therefore, in case that the permanent magnet is employed in the transfer device of the wireless charger, it is necessary to prevent magnetic saturation by permanent magnet. For this reason, as the first sheet 121 is provided so as to have a saturation magnetic flux density value relatively higher than that of the ferrite sheet in a frequency band of 100 to 300 kHz, the first sheet 121 located on the upper side of the wireless power transfer antenna 116 can prevent magnetization by the permanent magnet in a frequency band of 100 to 300 kHz in which wireless charging is performed smoothly.

In addition, when the permeability loss rate of the first sheet 121 is lower than that of the second sheet 122 even if the first sheet 121 and the second sheet 122 have the same permeability in the frequency band of 100 to 300 kHz, as a result the permeability loss according to the permeability loss rate is reduced when the wireless charging is performed. Accordingly, the time-varying magnetic field generated by the power transmission in the frequency band of 100 to 300 kHz from the transmission device is induced to the first sheet 121 having a relatively high permeability. Thus, the wireless power transmission antenna 116 disposed on the first sheet 121 can receive the wireless power signal with high efficiency.

Meanwhile, the second sheet 122 may be provided to have a relatively higher magnetic permeability at a frequency of 13.56 MHz, which is a high frequency, than that of the first sheet. When the first sheet 121 and the second sheet 122 have the same permeability, the permeability loss rate of the second sheet 122 may be set to be relatively smaller than the permeability loss rate of the first sheet 121.

For example, Each of the ribbon sheets 123a, 123b and 123c including at least one of an amorphous alloy and a nanocrystalline alloy may be used for the first sheet 121, and the ferrite sheet may be used for the second sheet 122.

Accordingly, the ferrite sheet has a relatively higher magnetic permeability than that of the ribbon sheets 123a, 123b and 123c including at least one of an amorphous alloy and a nanocrystalline alloy in the frequency of 13.56 MHz. Thus, when NFC is performed, a time-varying magnetic field generated by the high frequency of 13.56 MHz generated from an antenna equipped in an RF reader device is induced to the second sheet 122 having a relatively high permeability, so that the NFC antenna 114 disposed on the second sheet 122 can receive the high frequency signal with high efficiency.

In addition, when the permeability loss rate of the second sheet 122 is lower than that of the first sheet 122 even if the first sheet 121 and the second sheet 122 have the same permeability in a frequency band of 13.56 kHz, as a result the permeability loss according to the permeability loss rate is reduced when the NFC is performed. Accordingly, the time-varying magnetic field generated by the high frequency of 13.56 MHz generated from an antenna equipped in an RF reader apparatus is induced to the second sheet 122 having a relatively high permeability, so that the NFC antenna 114 disposed on the second sheet 122 can receive the high frequency signal with high efficiency.

Here, the ribbon sheet including at least one of an amorphous alloy and a nanocrystalline alloy may be used for the first sheet 121, and the ferrite sheet may be used for the second sheet 122. However, the present invention is not limited thereto. The material of the first sheet 121 and the second sheet 122 may be variously changed as long as the permeability, the saturation magnetic field, and the loss value included in the permeability satisfy the conditions relative to each other in the corresponding frequency band.

In an exemplary embodiment, the first sheet 121 and the second sheet 122 may be made of the same material having different magnetic permeabilities at the frequency of 100 to 300 kHz and/or at the frequency of 13.56 MHz. The ferrite sheet may be used for the first sheet 121, and a thin-film ribbon sheet including at least one of an amorphous alloy and a nanocrystalline alloy may be used for the second sheet 122. Even if they are made of the same material, they can be manufactured to have different characteristics (permeability, saturation magnetic field, permeability loss rate, etc.) through various conditions such as the heat treatment temperature, the number of layers, etc.

A polymer sheet, a ferrite sheet, or the like as well as a ribbon sheet including at least one of an amorphous alloy and a nanocrystalline alloy may be used for the first sheet 121 and the second sheet 122.

Here, the amorphous alloy and the nanocrystalline alloy may be Fe-based or Co-based magnetic alloys, and the amorphous alloy or the nanocrystalline alloy may include a three-element alloy or a five-element alloy. For example, the three-element alloy may include Fe, Si, and B, and the five-element alloy may include Fe, Si, B, Cu, and Nb. The ferrite sheet may be a sintered ferrite sheet, and may include at least one of Mn—Zn ferrite and Ni—Zn ferrite. Preferably, the ferrite sheet may be made of Ni—Zn sintered ferrite.

Figure 3:
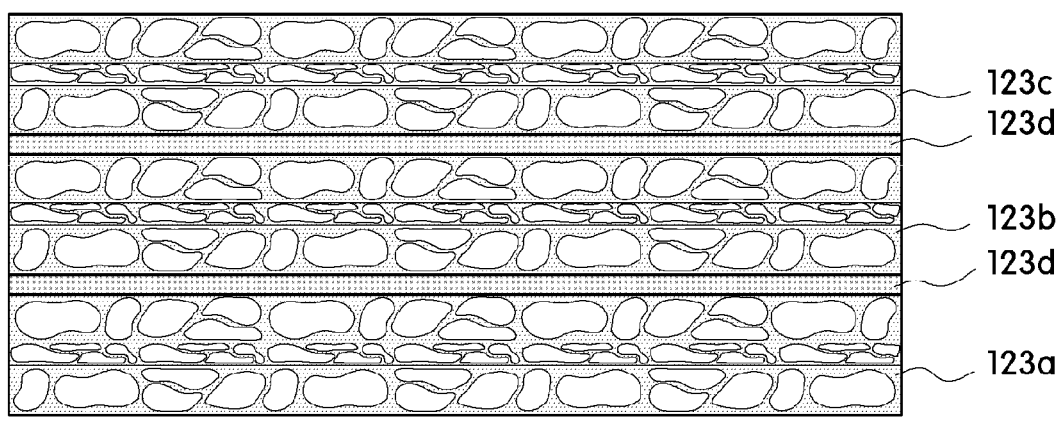
FIG. 3 is a detailed sectional view showing a case where the first sheet and the second sheet applied to the present invention are stacked with a multi-layer ribbon sheet.

As shown in FIG. 3, in an exemplary embodiment the first sheet 121 and the second sheet 122 may have a multilayer structure, in which a plurality of ribbon sheets 123*a*, 123*b* and 123*c* including at least one of an amorphous alloy and a nanocrystalline alloy are stacked.

In addition, the first sheet 121 and the second sheet 122 are not limited to the above-mentioned kinds, and other materials can be used as long as they have a magnetic property and a permeability in the range of 100 to 1,200.

In an exemplary embodiment, at least one of the first sheet 121 and the second sheet 122 may be divided into a plurality of fine pieces so as to suppress the generation of eddy currents. The plurality of fine pieces may be separated from each other, or may be totally or partially insulated from each other. In addition, the plurality of fine pieces may be provided in a size of 1 μm to 3 mm, and each piece may be irregularly randomized.

When a plurality of sheets 123*a*, 123*b* and 123*c* formed by separated fine pieces are stacked to form multiple layers in at least one of the first sheet 121 and the second sheet 122, an adhesive layer 123*d* made of a non-conductive material may be disposed between adjacent sheets to permeate between the pair of sheets stacked on each other so that the adhesive layer 123*d* can insulate the plurality of fine pieces constituting each sheet from each other.

Here, the adhesive layer may be provided as an adhesive agent, or may be provided as a substrate in the form of a film, in which an adhesive agent is applied on a surface or on both surfaces.

It should be noted that the shielding units 120 and the wireless power transfer module 100 including the same according to the exemplary embodiments of the present invention can be applied to the wireless charging method of the Qi standard or Power Matters Alliance (PMA) standard, which is provided a separate attractor for inducing magnetic force line between the shielding unit 120 and the antenna unit 110. In addition, the antenna for wireless power transmission may be an Alliance for Wireless Power (A4WP) standard-type antenna using magnetic resonance, or may be an antenna operating in a magnetic induction manner. The antenna for wireless power transmission may operate in a magnetic induction manner and another A4WP standard-type antenna using the magnetic resonance may be included to a separate other antenna.

In case that the wireless power transfer module is used as a receiving module, the wireless transfer module may be attached to a back cover of electronic device such as a portable terminal.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A shielding unit for wireless power charging comprising:
   a first sheet for a wireless power transfer antenna, and
   a second sheet for another antenna operating in a different frequency band from that of the wireless power transfer antenna,
   wherein the first sheet is provided in a first region which is disposed on a side of a virtual boundary line, and the second sheet is provided in a second region which is disposed on the opposite side of the first region,
   wherein the first sheet and the second sheet are provided adjacent to each other such that at least one side of the first sheet and the second sheet are in parallel on the same plane,
   wherein the first sheet and the second sheet are covered by a protective film on the same plan,
   wherein the first sheet and the second sheet are arranged such that one of ends of the first sheet and the second are overlapped each other,
   wherein the first sheet and the second sheet have different characteristics in a predetermined frequency band, and
   wherein the second sheet satisfies at least one of the following conditions of 1) to 2) in a frequency of 13.56 MHz, compared to the first sheet, 1) permeability: the first sheet< the second sheet, 2) permeability: the first sheet=the second sheet, permeability loss rate: the first sheet> the second sheet.

2. The shielding unit for wireless power charging of claim 1, wherein the first sheet satisfies at least one of the following conditions of 1) to 3) in a frequency band of 100 to 300 kHz, compared to the second sheet,
   1) permeability: the first sheet> the second sheet,
   2) saturating permeability: the first sheet> the second sheet,
   3) permeability: the first sheet=the second sheet, permeability loss rate: the first sheet< the second sheet.

3. The shielding unit for wireless power charging of claim 1, wherein the first sheet is a ribbon sheet including at least one of an amorphous alloy and nanocrystalline alloy, and the second sheet is a ferrite sheet.

4. The shielding unit for wireless power charging of claim 3, wherein the first sheet is formed by stacking a plurality of the ribbon sheets.

5. The shielding unit for wireless power charging of claim 1, wherein the wireless power transfer antenna is disposed on a surface of the first sheet, and another antenna is an Near Field Communication (NFC) antenna disposed on a surface of the second sheet.

6. The shielding unit for wireless power charging of claim 1, wherein the second sheet includes an extended sheet disposed on the first region, and the first sheet is stacked on the extended sheet.

7. A wireless power transfer module comprising;
   an antenna unit including a wireless power transfer antenna and at least one other antenna operating in a different frequency band from that of the wireless power transfer antenna; and a shielding unit disposed on a surface of the antenna unit to shield a magnetic field and to condense the magnetic field in a desired direction the shielding unit including a first sheet for a wireless power transfer antenna, and a second sheet for another antenna operating in a different frequency band from that of the wireless power transfer antenna, wherein:

the first sheet is provided in a first region which is disposed on a side of a virtual boundary line, and the second sheet is provided in a second region which is disposed on the opposite side of the first region, the first sheet and the second sheet are provided adjacent to each other such that at least one side of the first sheet and the second sheet are in parallel on the same plane, wherein the first sheet and the second sheet are covered by a protective film on the same plane, the first sheet and the second sheet are arranged such that one of ends of the first sheet and the second are overlapped each other, wherein the first sheet and the second sheet have different characteristics in a predetermined frequency band, and the second sheet satisfies at least one of the following conditions of 1) to 2) in a frequency of 13.56 MHz, compared to the first sheet, 1) permeability: the first sheet< the second sheet, 2) permeability: the first sheet=the second sheet, permeability loss rate: the first sheet> the second sheet.

8. The wireless power transfer module of claim 7, wherein at least one of the first sheet and the second sheet are divided into a plurality of fine pieces.

9. The wireless power transfer module of claim 8, wherein the fine pieces are entirely or partially insulated from each other.

10. The wireless power transfer module of claim 8, wherein the fine pieces have an irregular shape.

11. The wireless power transfer module of claim 7, wherein the antenna unit includes an Magnetic Secure Transfer (MST) antenna.

12. The wireless power transfer module of claim 11, wherein the MST antenna is disposed on the first region or on the second region.

* * * * *